United States Patent [19] [11] 4,178,955
Dau [45] Dec. 18, 1979

[54] VEHICLE FUEL TANK

[75] Inventor: Wolfram Dau, Wolfsburg, Fed. Rep. of Germany

[73] Assignee: Volkswagenwerk Aktiengesellschaft, Wolfsburg, Fed. Rep. of Germany

[21] Appl. No.: 902,412

[22] Filed: May 3, 1978

[30] Foreign Application Priority Data

Jun. 18, 1977 [DE] Fed. Rep. of Germany ....... 2727497

[51] Int. Cl.² ............................................. B65D 1/24
[52] U.S. Cl. .................................. 137/264; 137/265; 220/23.83; 220/20.5
[58] Field of Search ................. 220/20.5, 23.83, 23.86; 137/264, 265

[56] References Cited

U.S. PATENT DOCUMENTS

| 3,168,904 | 2/1965 | Conover | 137/264 X |
| 3,207,203 | 9/1965 | Mack | 137/265 |
| 3,610,458 | 10/1971 | Nissley | 220/23.83 X |

Primary Examiner—Alan Cohan
Attorney, Agent, or Firm—Brumbaugh, Graves, Donohue & Raymond

[57] ABSTRACT

A vehicle fuel tank has indentations on the bottom wall which form an internal pocket between oppositely facing surfaces of the indentations. A reserve tank is mounted in the pocket. In a preferred embodiment, the reserve tank is clamped by the surfaces using an elastic member with radial prolongations, at least some of which, in the assembled condition, are oriented in opposition to the direction of removal of the reserve tank.

5 Claims, 4 Drawing Figures

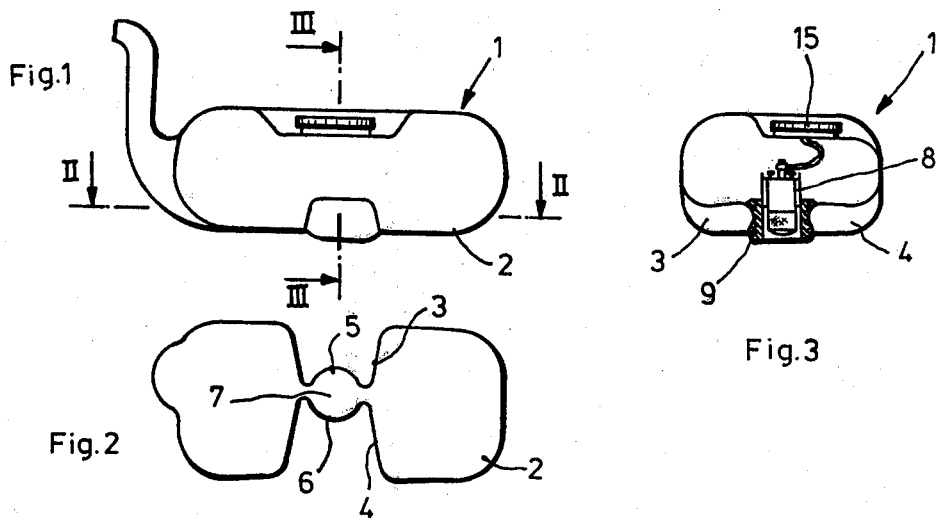
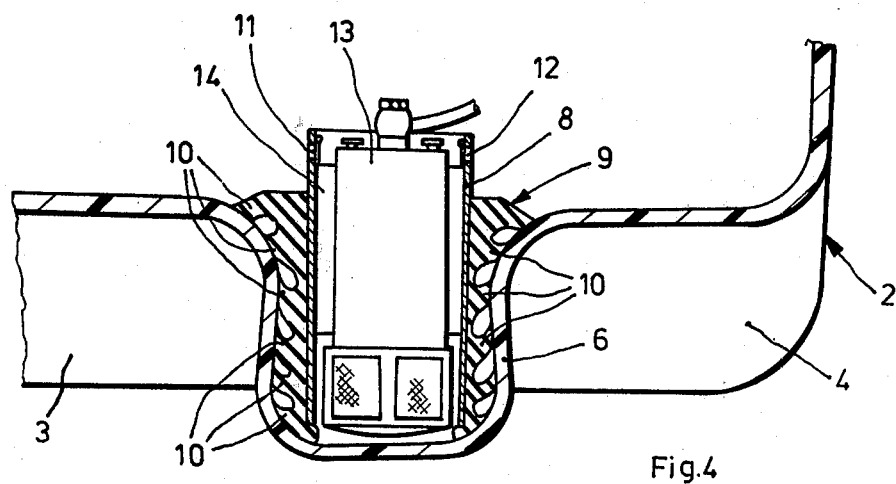

VEHICLE FUEL TANK

BACKGROUND OF THE INVENTION

This invention relates to fuel tanks for vehicles, and particularly to fuel tanks which include a reserve tank mounted at the bottom of the tank enclosure for maintaining a quantity of fuel adjacent the outlet line while the vehicle traverses curves.

It is an object of the invention to provide a simplified arrangement for clamping the reserve tank within the fuel tank, and particularly such an arrangement which is applicable to a plastic fuel tank, which is blow molded from tubing.

SUMMARY OF THE INVENTION

In accordance with the invention, a vehicle fuel tank includes a tank enclosure having a bottom wall which is formed with first and second indentations. The indentations are arranged to form an internal pocket within the tank between oppositely facing internal surfaces of the indentations. A reserve tank communicating with a fuel outlet line is mounted to the bottom in the pocket and clamped by its lower periphery between the oppositely facing surfaces.

An intermediate elastic member may be provided between the oppositely facing surfaces and the periphery of the reserve tank. The elastic member preferably has radial prolongations at least some of which are oriented in opposition to the direction of removal of the reserve tank when the reserve tank is positioned within the pocket. For improved clamping of the reserve tank, the indentations may be shaped so that the oppositely facing surfaces are closer to each other in an upper portion than in a lower portion of the pocket. For proper guiding of the fuel when the vehicle traverses a curve, the indentations should have a larger cross-section near the side walls of the tank than near the clamping surfaces. The tank arrangement is suitable for fabrication out of blow molded plastic.

The indentations of the tank of the present invention can not only provide convenient clamping support for the reserve tank, but they can also replace baffles or deflectors which are usually provided in vehicle tanks for guiding fuel into the reserve tank when the vehicle traverses a curve. By integrally forming the indentations in the bottom wall of the tank, the usual requirement for separate attaching of baffles or guide surfaces is eliminated.

The reserve tank may include an electric fuel pump. In this case, an intermediate elastic element, having the shape of a hollow cylinder, can be provided between the outer wall of the reserve tank and the oppositely facing surfaces of the indentation. This intermediate element will reduce transmission of noises from the fuel pump and can provide a particularly simple and durable manner of attaching the reserve tank between the clamping surfaces. The clamping action is especially advantageous if radial prolongations of the elastic element are provided, which, upon insertion of the reserve tank, bend in a direction in which they oppose removal of the tank. An intermediate elastic element with such prolongations is relatively easily installed, but after installation, the elongations act like barbs and make removal difficult. The clamping action of the intermediate element is enhanced if the pocket is tapered from a larger width at a lower portion to a smaller width at an upper portion.

For a better understanding of the present invention, together with other and further objects, reference is made to the following description, taken in accordance with the accompanying drawings and its scope will be pointed out in the appended claims.

BRIEF DESCRIPTION OF THE DRAWINGS

FIG. 1 is a side view of a fuel tank in accordance with the present invention.

FIG. 2 is an elevation cross-section of the FIG. 1 tank.

FIG. 3 is a longitudinal cross-section of the FIG. 1 tank.

FIG. 4 is an enlarged view of a portion of the FIG. 3 cross-section.

DESCRIPTION OF THE INVENTION

Referring to the drawing of FIGS. 1 through 4, there is shown a fuel tank in accordance with the present invention. The tank includes a tank enclosure 1 which has bottom wall 2 formed with a pair of indentations 3 and 4. Indentations 3 and 4 are shaped so that they form an internal pocket 7 within tank enclosure 1. The inner end surfaces of indentations 3 and 4 form oppositely facing clamping surfaces 5 and 6 which form a pocket 7 in a shape which accommodates a cylindrical reserve tank 8. Each of indentations 3 and 4 starts at a respective tank side wall and has a tapered crosssectional dimension which decreases starting from the sidewall in the direction of the clamping surfaces 5 and 6 which are near the center of the tank. This tapered shape insures that the indentations act as guiding surfaces for fuel as the vehicle travels around a corner or is otherwise subjected to transverse forces.

As is evident from the cross-sectional views of FIGS. 3 and 4, the lower periphery of reserve tank 8 is surrounded by an elastic intermediate element 9 and thereby clamped within the pocket 7 formed by indentations 3 and 4. Intermediate element 9 has radial prolongations 10 which are sufficiently long so that they are bent in upward direction when reserve tank 8 and the attached intermediate element is pushed into the pocket between the oppositely facing surfaces 5 and 6. At least some of the prolongations 10, which are bent in the upward direction, act to prevent the removal of the reserve tank by acting as barbs opposing upward motion of the tank. It should be recognized that element 9 could alternately be secured to the surfaces 5 and 6 and the prolongations 10 would extend radially inward and would be bent in a downward direction when reserve tank 8 is inserted into pocket 7. In either case, upon assembly, the prolongations are oriented in a direction which opposes removal of the reserve tank.

The locking of tank 8 in pocket 7 by the bending of prolongations 10 is further assisted by the fact that clamping surfaces 5 and 6 are closer together in an upper region of the pocket than in a lower region, as shown in FIGS. 3 and 4. This reverse taper of pocket 7 enhances the locking action of elastic element 9.

Reserve tank 8 includes fuel ports and flaps 11 and 12 which operate to permit fuel to enter the fuel tank but prevent discharge of fuel from the tank. When the vehicle containing the tank traverses a curve, the ports and flaps on the inside of the curve open to permit entry of fuel, while the ports and flaps on the outside of the curve remain closed to prevent discharge of fuel from the reserve tank.

In the illustrated embodiment, the reserve tank 8 is provided with a fuel pump 13 which is mounted by an elastic intermediate cylinder 14. The electric connection lines as well as the outlet fuel line of pump 13 are connected to tank cover 15. The opening closed by cover 15 is large enough to permit access for assembly of the reserve tank into the bottom wall of enclosure 1.

While there have been described what are believed to be the preferred embodiments of the invention, those skilled in the art will recognize that other and further modifications may be made thereto without departing from the spirit of the invention, and it is intended to claim all such embodiments as fall within the true scope of the invention.

I claim:

1. A vehicle fuel tank comprising a tank enclosure having a bottom wall, said bottom wall being formed with first and second indentations, said indentations being arranged to form an internal pocket within the tank between oppositely facing surfaces of said indentations, and a reserve tank, communicating with a fuel outlet line and mounted to said bottom in said pocket and clamped by its lower periphery between said oppositely facing surfaces.

2. A tank as specified in claim 1 wherein there is provided an intermediate elastic member between said oppositely facing surfaces and said periphery of said reserve tank, said elastic member having radial prolongations, at least some of which, in the assembled state of said tank are oriented in opposition to the direction of removal of said reserve tank.

3. A tank as specified in claim 2 wherein said oppositely facing surfaces are closer to each other in an upper portion than in a lower portion of said pocket.

4. A tank as specified in claim 1 wherein said indentations have a larger cross-section near the sidewalls of said tank than near said surfaces.

5. A tank as specified in claims 1, 2, 3, or 4 wherein said tank is fabricated from blown plastic.

* * * * *